E. H. ANGAMAR.
Cane-Planter.
No. 29,842.  Patented Aug. 28, 1860.
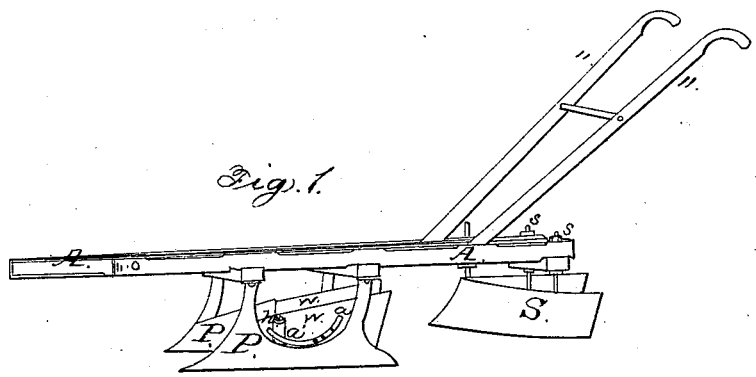
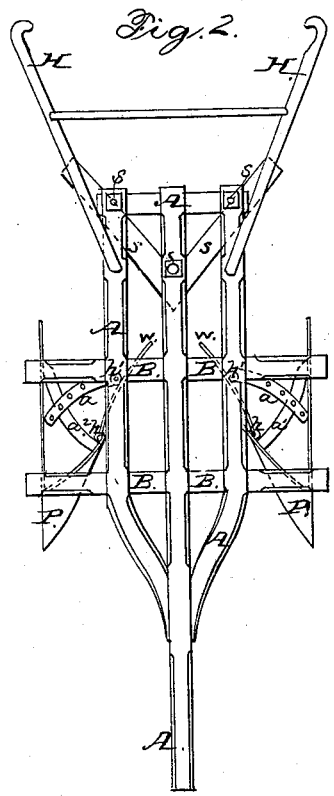
WITNESSES;
F. W. Howard
INVENTOR
E. H. Angamar
By his Attorney
Chas. F. Sansbury

UNITED STATES PATENT OFFICE.

E. H. ANGAMAR, OF NEW ORLEANS, LOUISIANA, ASSIGNOR TO HIMSELF AND TOBIAS MARCUS, OF NEW YORK, N. Y.

IMPROVEMENT IN CANE-COVERERS.

Specification forming part of Letters Patent No. 29,842, dated August 28, 1860.

*To all whom it may concern:*

Be it known that I, E. H. ANGAMAR, of the city of New Orleans, in the State of Louisiana, have invented an Improvement in Cane-Planters; and I do hereby declare the following to be a correct description of the same, reference being had to the accompanying drawings, in which—

Figure 1 is a side view of my improved cane-planter, and Fig. 2 is a plan or top view of the same.

The same part is marked by the same letter of reference in both figures.

My invention is an improvement on the cane-planter invented by Tobias Marcus and patented December 1, 1857; and it consists in arranging on the two sides of the frame of a plow two mold-boards with adjustable wings for throwing the earth toward the center line of the plow, and following them by an adjustable scraper to regulate and render equal the depth of earth applied by the covering mold-boards, all as hereinafter more particularly set forth.

To enable others to make and use my improved cane-planter, I will proceed to describe its construction and operation, referring to the drawings, in which—

A marks the longitudinal portions of the plow-frame; B, the cross-framing; H, the plow-handles, P, the covering mold-boards attached to cross-frame B; W, the wings of said mold-boards; $h$, the hinges by which the wings are attached to the mold-boards; $a\,a$, curved arms attached to wings W; $a'$, braces passing from the landsides to the mold-boards P, to support the latter. Upon these braces the curved arms $a$ traverse and are attached, when desired, by pins passing through both. The arms $a$ are hinged to the wings W at $h'$. They have holes in them, as shown, through which pins pass into holes in braces $a'$ to fix the wings in any required position.

S marks the scraper which follows the covering-plows. It has the shape and position shown, its point coinciding with the central line of the implement and its sides spreading out as they recede. It is attached by three long screw-rods passing up through the frame, as shown, each having two nuts or taps upon it, one above and the other below the frame, by means of which the scraper can be raised or lowered to any desired position, so as to remove more or less earth in its passage over the ground, according to the requirements of the work to be done.

The operation is as follows: The twin covering-plows P P are set at such distance from the central beam as may be deemed best, and the wings are fixed at such angle with the mold-boards as may be found by experiment to perform the work to most advantage. This will vary with the nature and condition of the soil. The scraper S is adjusted to the proper height and inclination, which will also be determined by trial, and vary, as in the case of the wings, with the character and state of the soil operated upon. The cane plants or seed having been placed in the usual way in furrows previously prepared, the planter is drawn forward over it, and the mold-boards P and wings W throw the earth from the sides of the furrow over upon the plants or seeds, covering them to an irregular and perhaps improper depth, and throwing upon them clods and stones as well as soft and pulverized soil. The scraper S, following, removes all the hard and large substances and all surplus earth and leaves the plants evenly covered to the required depth with the properly divided soil. It will also, if properly adjusted, give to the hill or ridge thrown up by the twin plows P whatever pitch or curvature may be required for drainage and the best development of the plants.

Having thus fully described my invention and improvement, what I claim, and desire to secure by Letters Patent, is—

The combination and arrangement of the twin adjustable covering-plows P P with the adjustable scraper S, substantially as and for the purpose specified.

The above specification of my said invention signed and witnessed this 17th day of February, A. D. 1860.

E. H. ANGAMAR.

Witnesses:
 I. E. LEROY,
 CHARLES CHMITT.